United States Patent Office 3,238,235
Patented Mar. 1, 1966

---

3,238,235
FLUORINATED AMIDO CARBOXYLIC ACIDS AND SALTS THEREOF
Murray Hauptschein, Glenside, and Sameeh S. Toukan, Levittown, Pa., assignors to Pennsalt Chemicals Corporation, Philadelphia, Pa., a corporation of Pennsylvania
No Drawing. Filed Apr. 29, 1963, Ser. No. 276,160
12 Claims. (Cl. 260—404)

This invention relates to fluorinated compounds having valuable surface properties and more specifically is concerned with certain new derivatives of long chain perfluorinated carboxylic acids which possess such surface properties in a particularly high degree.

It is known that relatively long chain perfluorinated carboxylic acids and salts thereof, e.g. perfluorooctanoic acid and its ammonium and metal salts, have unusual surface properties. They are known for example to reduce the surface tension of aqueous systems to unusually low values and thus have valuable uses as ultra-performance surfactants in such systems. According to this invention, certain new derivatives of certain high members of such acids have been found to display surface properties which are superior in a marked and surprising degree to the acids themselves, to the salts of such acids, as well as to compounds of similar types derived from perfluorinated sulfonic acids.

The new compounds of the invention may be represented by the general formula $$\underset{R}{C_nF_{2n+1}\overset{O}{\overset{\|}{C}}-N-R'-\overset{O}{\overset{\|}{C}}-OM}$$

where $C_nF_{2n+1}$ is a perfluoroalkyl group which may have a straight or branched chain and which has a chain length of at least seven carbon atoms; where $n$ is an integer having a value ranging from 8 to 13; where R is hydrogen or an alkyl group (which may be straight or branched) having from 1 to 4 carbon atoms; where R' is an alkylene radical or a monohydroxyalkylene radical (which may be straight or branched) having from 1 to 6 carbon atoms and where M is hydrogen, an alkali metal or ammonium.

Of particular value are compounds of the above type where the perfluoroalkyl group $C_nF_{2n+1}$ contains from 10 to 12 carbon atoms. Despite the very low solubility of such compounds in aqueous systems they display remarkably superior surface properties when employed in such systems. Of particular value also are compounds of the above type where R is hydrogen or an alkyl group containing from 1 to 2 carbon atoms; and those in which R' is an alkylene radical having from 1 to 3 carbon atoms.

Typical examples of the new compounds of the invention shown in the form of the free acid are the following:

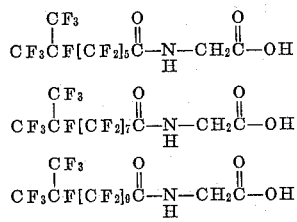

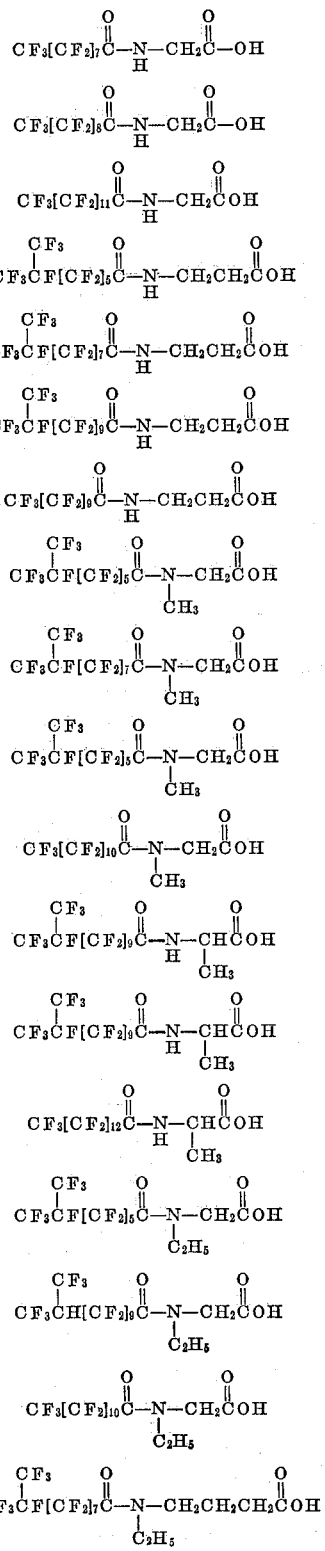

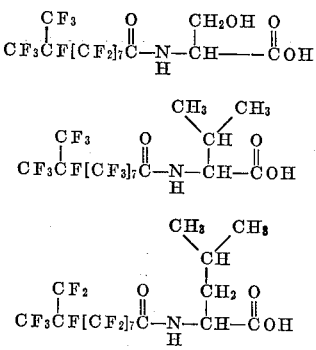

The new compounds of the invention may be prepared by the direct reaction of the acid fluoride or the acid chloride of a perfluorinated carboxylic acid of the proper chain length with an amino acid. This reaction may be illustrated by the reaction of perfluorononanoic acid fluoride with glycine in accordance with the following:

The reaction is preferably carried out by dissolving or suspending the perfluoro acid fluoride in an anhydrous solvent and mixing the solution slowly with a suspension of the amino acid in the same solvent and then refluxing the mixture for several hours. The amino acid may be added slowly to the perfluoro acid fluoride or conversely, the acid fluoride may be added slowly to the amino acid. The reaction mixture is filtered to remove insoluble material which generally includes excess amino acid and its hydrogen fluoride salt, after which the amide product may be isolated by evaporation of the solvent and purified if necessary by crystallization, or similar techniques. Suitable anhydrous solvents include e.g. diethylether, dimethoxyethane, $CH_3OCH_2CH_2OCH_3$, tetrahydrofuran, trichlorotrifluoroethane and benzene. Reaction temperatures of from 0° C. to 150° C. and more usually from 20° C. to 100° C. will generally be used. Sufficient amino acid is employed to insure high conversion of the perfluoro acid fluoride, molar ratios of the amino acid to the perfluoro acid fluoride of from 1:1 to about 3:1 being generally preferred. Reaction may be generally carried out most conveniently at atmospheric pressure and reaction times of from about 10 minutes to 10 hours are generally satisfactory.

The compounds of the invention may also be prepared by the direct reaction of an amino acid with a perfluorinated halosulfate of the formula $C_nF_{2n+1}OSO_2Z$ where $n$ is an integer ranging from 9 to 14 and where Z is chlorine or fluorine. This method may be illustrated by the reaction of perfluorononyl chlorosulfate with glycine in accordance with the following:

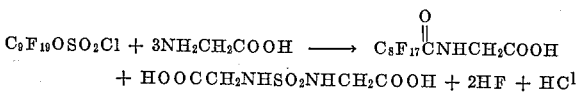

This reaction is carried out preferably by dissolving or suspending the perfluoroinated halosulfate in an anhydrous solvent and the solution then mixed with a suspension of the amino acid in the same solvent followed by refluxing for sufficient time to insure complete reaction. Insoluble material is then removed by filtration after which the crude product is isolated by evaporation of the solvent followed sometimes by recrystallization.

If desired a tertiary amine, e.g. triethylamine or pyridine may be added to the reaction mixture in either of the above methods of synthesis to act as a scavenger for the hydrogen halide liberated during the reaction.

Another less preferred procedure for the preparation of the compounds of the invention involves the initial preparation of an amide by the reaction of a perfluorinated acid halide or a perfluorinated halosulfate with a primary amine. The amide thus produced is then reacted with metallic sodium in an organic solvent such as toluene to form a sodium derivative which is then reacted with a chloro or bromo ester to form an ester derivative which is then hydrolyzed to provide the desired end product. This method may be illustrated by the preparation of

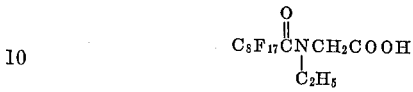

starting with the chlorosulfate $C_9F_{19}OSO_2Cl$ in accordance with the following:

(a)
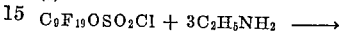
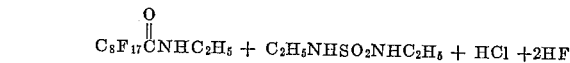

(b)
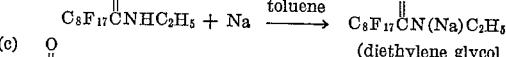

(c)
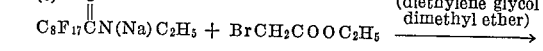

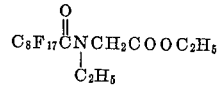

(d)
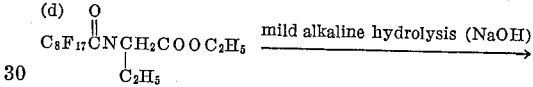

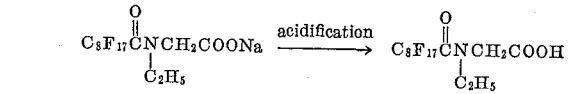

After preparation of the free acid as described above, the alkali metal salts such as the ammonium salt, potassium salt, sodium salt, lithium salt, etc. may be readily prepared, preferably by dissolving the free acid in a solvent such as isopropanol, ethanol or methanol, and titrating the solution to its equivalence point with a solution of the alkali metal hydroxide preferably in a solvent such as ethanol, methanol, or an aqueous alcoholic solution. The salt is readily recovered by evaporation of the solvent and drying at a temperature range of 40–80° C.

The ammonium salt may be readily prepared by passing ammonia gas through a solution of the free acid in a solvent such as diethyl ether, methanol, isopropanol, $CF_2ClCFCl_2$ or acetone, after which the solvent is evaporated to recover the ammonium salt.

The perfluorinated carboxylic acid fluorides used to prepare the compounds of the invention may be obtained in a variety of ways. Perfluorinated acid fluorides containing up to 10 carbon atoms may be prepared by the electrochemical fluorination of the corresponding hydrocarbon carboxylic acid in liquid hydrogen fluoride as described for example in U.S. Patent 2,519,983 of Simons. The perfluorinated acid fluorides may also be obtained by the reaction of perfluorinated iodides with fuming sulfuric acid as described in co-pending application Serial No. 212,137, filed July 24, 1962, now abandoned, of Murray Hauptschein and Chester L. Parris for Preparation of Fluorinated Organic Compounds. The fluorinated iodide precursors may be prepared by telomerization procedures such as by the reaction of perfluoroisopropyl iodide $(CF_3)_2CFI$ or perfluoroethyl iodide $CF_3CF_2I$ with tetrafluoroethylene to produce telomers of the formula
$(CF_3)_2CF[CF_2CF_2]_nI$ and $CF_3CF_2[CF_2CF_2]_nI$
respectively.

The perfluoroinated chlorosulfates or fluorosulfates may be prepared by the reaction of perfluorinated iodides with chlorosulfonic or fluorosulfonic acid following the procedures described in detail in co-pending application Serial No. 735,702, filed May 16, 1958, now abandoned, of Murray Hauptschein and Milton Braid for Halogenated Organic Compounds.

Examples of suitable amino acids useful for preparing the compounds of the invention are the following:

glycine _____ NH₂CH₂COOH
β-alanine _____ NH₂CH₂CH₂COOH
sarcosine _____ HN—CH₂COOH
                                      |
                                      CH₃

CH₃
                                      |
alanine _____ NH₂CHCOOH

CH₂OH
                                      |
serine _____ NH₂CHCOOH

γ-aminobutyric acid _____ NH₂CH₂CH₂CH₂COOH

CH₃   CH₃
                                        \ /
                                        CH
                                        |
valine _____ NH₂CH—COOH CH₃   CH₃
                                        \ /
                                         CH
                                         |
                                         CH₂  O
                                         |    ‖
Leucine _____ NH₂—CH—C—OH The following examples illustrate the preparation of the new compounds of the invention.

*Example 1.—Preparation of perfluoro[9-methyldecanoyl] fluoride*

A 1400 milliliter stainless steel autoclave is charged with 900 grams of fuming sulfuric acid (35% by weight of SO₃) and 278 grams (0.4 mole) of perfluoro[9-methyldecyl] iodide, [CF₃]₂CF[CF₂]₈I. The autoclave is sealed and heated with shaking at 145–155° C. for 16 hours, after which it is cooled to room temperature, opened, and the contents transferred to a separatory funnel while carefully excluding moisture from the product. The reaction mixture separates cleanly into a lower sulfuric acid phase and an upper organic phase. Upon careful separation of the two phases, 228 grams of organic material is collected and vacuum distilled. There is obtained 178.4 grams (80% yield) of the acid fluoride [CF₃]₂CF[CF₂]₇COF having a boiling point of 81° at 30 mm. Hg, and 43.2 grams (19% yield) of the perfluorinated acid [CF₃]₂CF[CF₂]₇COOH, M.P. 61–64° C. and a product hydrolyzable thereto, and only about 3 grams (1%) of unreacted iodide. The infrared spectrum of the acid fluoride shows a characteristic strong peak at 5.30μ while the carboxylic acid shows characteristic strong bands in the infrared spectrum at 3.20μ, 5.62μ and 6.95μ.

*Example 2.—Preparation of N-[perfluoro(9-methyldecanoyl)]aminoacetic acid*

To a stirred suspension of 7.50 grams (0.10 mole) of glycine, NH₂CH₂COOH, in 70 milliliters of anhydrous dimethoxyethane there is slowly added a solution of 11.30 grams (0.02 mole) of

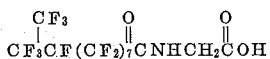

in 30 milliliters of anhydrous dimethoxyethane. This mixture is refluxed under nitrogen for 4 hours at atmospheric pressure (reflux temperature approximately 85° C.). The reaction mixture is filtered to remove 6 grams of insoluble material and the solvent of the filtrate is removed by distillation in vacuo at a bath temperature of 50–60° C. The residue is extracted with three 50 milliliter portions of diethyl ether. The ether extract is decanted from the residue, washed with about 150 milliliters of water, dried with anhydrous magnesium sulfate and evaporated on steam bath to give 11.2 grams (90% yield) of a liquid residue which rapidly solidifies on standing at room temperature. Upon recrystallization of this product from a mixture of benzene and ethyl acetate in the ratio of 9:1 there is obtained a white crystalline solid having a melting point of 130–131° C., this being the product N-[perfluoro(9 - methyldecanoyl)]aminoacetic acid,

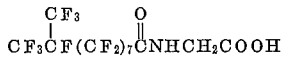

Analysis, calculated for C₁₃H₄F₂₁NO₃: C, 25.1; H, 0.65; N, 2.25; molecular weight, 621. Found: C, 25.1; H, 0.38; N, 2.14; molecular weight (neutralization equivalent), 616. The infrared spectrum of this compound shows strong bands at 5.82μ and 6.43μ characteristic of a secondary amide.

*Example 3.—Preparation of potassium N-[perfluoro (9-methyldecanoyl)]aminoacetate*

The potassium salt of the acid

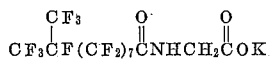

is prepared by dissolving the acid in a large excess of isopropanol and then titrating this solution to equivalence point with a 0.5 N potassium hydroxide in ethanol solution. The solution is evaporated to dryness at a temperature up to 80° C. and then dried in a vacuum desiccator at 40° C. to provide the potassium salt

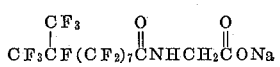

a white crystalline solid.

*Example 4.—Preparation of sodium N-[perfluoro(9-methyldecanoyl)]aminoacetate*

Following a procedure similar to that described in Example 3 except that a 0.5 N sodium hydroxide in ethanol solution is used instead of the potassium hydroxide solution, the sodium salt

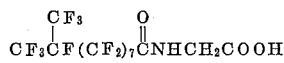

a white crystalline solid is obtained.

*Example 5.—Preparation of ammonium N-[perfluoro (9-methyldecanoyl)]aminoacetate*

The acid

is dissolved in a large excess of ethyl ether. Ammonia gas is bubbled through the solution at room temperature until precipitation is complete. The ether solvent is removed by evaporation under vacuum to provide the ammonium salt $$CF_3CF(CF_2)_7CNHCH_2CONH_4$$
(with CF₃ branch and C=O groups)

a white crystalline solid..

*Example 6.—Preparation of perfluoro[7-methyloctanoyl] fluoride*

A 1400 milliliter stainless steel autoclave is charged with 292 grams (0.49 mole) of perfluoro[7-methyloctyl] iodide, [CF₃]₂CF[CF₂]₆I and 900 grams of fuming sulfuric acid (35% by weight SO₃). The autoclave is sealed and heated with shaking at 134–143° C. for 16 hours. The autoclave is cooled and the contents transferred to a separatory funnel while carefully excluding moisture from the product. The reaction mixture separates cleanly into a lower sulfuric acid phase and an upper organic phase. Upon careful separation of the two phases 227 grams of organic product is collected and vacuum distilled. There is obtained 155.4 grams (73.8% yield) of the acid fluoride [CF₃]₂CF[CF₂]₅COF having a boiling point of 70° C. at 80 mm. Hg, 46.5 grams (21.8% yield) of the perfluorocarboxylic acid [CF₃]₂CF[CF₂]₅COOH and a product hydrolyzable thereto and 22 grams of unreacted iodide. The total yield of perfluoro acid fluoride plus perfluoro acid is 95.6%. The infrared spectrum of the acid fluoride shows a characteristic strong band at 5.30μ while the carboxylic acid shows characteristic strong bands at 3.20μ, 5.62μ and 6.95μ.

*Example 7.—Preparation of perfluoro[7-methyl-octanoyl] fluoride*

Following the procedures of Example 6, 292 grams of iodide $[CF_3]_2CF[CF_2]_4I$ is reacted with 900 grams of fuming sulfuric acid (35% $SO_3$ by weight) at a temperature of 132–138° C. for 8 hours. There is obtained 253 grams of organic product which is vacuum distilled to provide 154 grams of unreacted iodide and 93.2 grams of product, 92% of which is the acid fluoride $$(CF_3)_2CF(CF_2)_5COF$$

and 8% is the carboxylic acid $(CF_3)_2CF(CF_2)_5COOH$ and a product hydrolyzable thereto.

*Example 8.—Preparation of N-[perfluoro(7-methyloctanoyl)]aminoacetic acid*

To a stirred suspension of 7.50 grams (0.10 mole) of glycine in 70 milliliters of anhydrous diethyl ether there is slowly added a solution of 9.70 grams (0.021 mole) of $$CF_3CF(CF_2)_5CF \text{ (with CF}_3 \text{ branch and =O)}$$

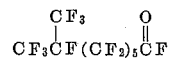

in 30 milliliters of anhydrous diethyl ether. The mixture is refluxed under nitrogen for 6½ hours at atmospheric pressure (reflux temperature about 35° C.). The reaction mixture is filtered to remove 6.3 grams of insoluble material. The filtrate is concentrated on a steam bath to provide 10 grams (92% yield) of a white solid residue. After recrystallization from benzene there is obtained a white crystalline product having a melting point of 97.5–99° C., this being the amido acid

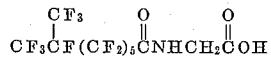

Analysis, calculated for $C_{11}H_4F_{17}NO_3$: C, 25.4; H, 0.77; N, 2.69; molecular weight, 521. Found: C, 25.5; H, 1.05; N, 2.62; molecular weight (neutralization equivalent) 516. The infrared spectrum of this compound displays strong bands at 5.83μ and 6.47μ.

The potassium salt, sodium salt and the ammonium salt of this acid are prepared by the methods set forth in Examples 3, 4 and 5 respectively. These salts are white crystalline solids.

*Example 9.—Preparation of perfluoro[11-methyldodecanoyl]fluoride*

A 1400 milliliter stainless steel autoclave is charged with 318.4 grams (0.4 mole) of perfluoro[11-methyldodecyl] iodide and 900 grams of fuming sulfuric acid (35% $SO_3$). The autoclave is sealed and heated with shaking at 160–165° C. for 16 hours. The autoclave is cooled and opened whereupon the organic product solidifies, permitting the spent sulfuric acid to be decanted off, after which the organic product weighing 252.5 grams is removed from the autoclave. Upon vacuum distillation of the organic product there is obtained 104 grams (58.1% yield) of the acid fluoride $[CF_3]_2CF[CF_2]_9COF$ having a boiling point of 88° C. at 7 mm. Hg, 33.0 grams (18.5% yield) of the perfluorocarboxylic acid $[CF_3]_2CF[CF_2]_9COOH$ having a melting point of 88–89° C. together with 105 grams of unreacted iodide. The infrared spectrum of the acid fluoride shows a characteristic strong band at 5.30μ while the carboxylic acid shows characteristic strong bands at 3.20μ, 5.62μ and 6.95μ.

*Example 10.—Preparation of N-[perfluoro(11-methyldodecanoyl)]aminoacetic acid*

Following the procedures of Example 2, the perfluorinated acid fluoride

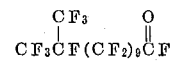

is reacted with glycine in a molar ratio of acid fluoride to glycine of 1:5 in refluxing dimethoxyethane for 5 hours. From this reaction mixture an 80% yield of a white crystalline solid,

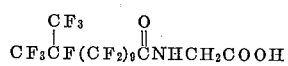

having a melting point of 148–149° C. is obtained. Analysis, calculated for $C_{15}H_4F_{25}NO_3$: C, 25.0; H, 0.56; N, 1.94; molecular weight, 721. Found: C, 25.0; H, 0.43; N, 2.00; molecular weight (neutralization equivalent), 728. The infrared spectrum of this compound displays strong bands at 5.82μ and 6.42μ.

The potassium, sodium and ammonium salts of the above acid are prepared following the procedures of Examples 3, 4 and 5 respectively. These salts are white crystalline solids.

*Example 11.—Preparation of N-[perfluoro(7-methyloctanoyl)]-3-aminopropionic acid*

To a stirred suspension of 8.90 grams (0.10 mole) of β-aminopropionic acid, $NH_2CH_2CH_2COOH$, in 70 ml. of anhydrous diethyl ether there is added slowly a solution of 11.60 grams (0.025 mole) of

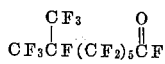

in 30 milliliters of anhydrous diethyl ether. This mixture is refluxed under nitrogen for 3 hours at atmospheric pressure (reflux temperature about 35° C.). The reaction mixture is filtered to remove 10 grams of insoluble material and the filtrate dried with anhydrous magnesium sulfate and then evaporated on a steam bath. There is obtained 10.70 grams (80% yield) of a liquid residue which solidifies quickly on standing at room temperature. Recrystallization of this material from benzene gives a white crystalline solid having a melting point of 88.5–90° C. and having the structure:

Analysis, calculated for $C_{12}H_6F_{17}NO_3$: C, 26.9; H, 1.13; N, 2.62; molecular weight, 535. Found: C, 27.2; H, 1.27; N, 2.70; molecular weight (neutralization equivalent), 529. The infrared spectrum of this compound displays strong bands at 5.87μ and 6.44μ.

The potassium, sodium and ammonium salts of the above acid are prepared following the procedures described in Examples 3, 4 and 5 respectively. These salts are white crystalline materials.

*Example 12.—Preparation of N-[perfluoro(9-methyldecanoyl)]-3-aminopropionic acid*

Following the procedures described in Example 2, the perfluorinated acid fluoride

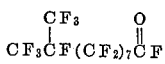

is reacted with β-aminopropionic acid in a ratio of acid fluoride to the amino acid of 1:5 in refluxing anhydrous dimethoxyethane for 6 hours. From this reaction mixture there is obtained a 79% yield of a white crystalline solid

having a melting point of 116–117° C. Analysis, calculated for $C_{14}H_6F_{21}NO_3$: C, 26.5; H, 0.95; N, 2.20; molecular weight, 635. Found: C, 26.5; H, 1.19; N, 2.18; molecular weight (neutralization equivalent), 630. The infrared spectrum of this compound displays strong bands at 5.82μ and 6.41μ.

The potassium, sodium and ammonium salts of the above acid are prepared according to the methods described in Examples 3, 4 and 5 respectively. These salts are white crystalline solids.

*Example 13.—Preparation of N-[perfluoro(11-methyl-dodecanoyl)]-3-amino-propionic acid.*

Following the procedures described in Example 2, the acid fluoride

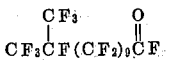

is reacted with β-aminopropionic acid in a ratio of the acid fluoride to the amino acid of 1:5 in refluxing dimethoxyethane for 6 hours. From this reaction there is obtained a 71% yield of a white crystalline solid product

having a melting point of 138–140° C. Analysis, calculated for $C_{16}H_6F_{25}NO_3$: C, 26.1; H, 0.82; N, 1.91; molecular weight, 735. Found: C, 26.3; H, 0.78; N, 1.96; molecular weight (neutralization equivalent), 730. The infrared spectrum of this compound displays strong bands at 5.85μ and 6.43μ.

The potassium, sodium and ammonium salts of the above acid are prepared following the procedures described in Examples 3, 4 and 5 respectively. These salts are white crystalline solids.

*Example 14.—Preparation of N-methyl-N-[perfluoro(7-methyloctanoyl)]-aminoacetic acid.*

To a stirred suspension of 11.60 grams (0.025 mole) of sarcosine,

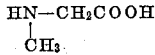

in 70 milliliters of anhydrous dimethoxyethane there is gradually added a solution of 8.90 grams (0.1 mole) of the acid fluoride

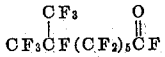

in 30 milliliters of anhydrous dimethoxyethane. This mixture is refluxed under nitrogen for 3 hours at atmospheric pressure (reflux temperature of about 85° C.). The reaction mixture is then filtered to remove 7.5 grams of insoluble material and the filtrate distilled under vacuum to remove the solvent. To the residue is added 50 milliliters of diethyl ether and the mixture is washed with water. The ether layer is then dried with anhydrous magnesium sulfate and evaporated on a steam bath to give 11.4 g. (85% yield) of a liquid residue which rapidly solidifies on standing at room temperature. Recrystallization of this product from benzene gives a white crystalline product having a melting point of 67.5–69° C, consisting of the product

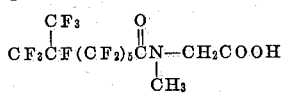

Analysis, calculated for $C_{12}H_6F_{17}NO_3$: C, 26.9; H, 1.13; N, 2.62; molecular weight, 535. Found: C, 26.9; H, 1.01; N, 2.63; molecular weight (neutralization equivalent), 526. The infrared spectrum of the compound displays strong bands at 5.74μ and 5.91μ.

The potassium, sodium and ammonium salts of the above acid are prepared in accordance with the procedures described in Examples 3, 4 and 5 respectively. The salts are white crystalline solids.

*Example 15.—Preparation of N-methyl-N-[perfluoro(9-methyldecanoyl)] aminoacetic acid*

Following the procedures of Example 14, the perfluorinated acid fluoride

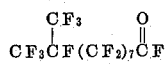

is reacted with sarcosine $CH_3NHCH_2COOH$, in a molar ratio of acid fluoride to sarcosine of 1:5 in refluxing dimethoxyethane for 8 hours. From this reaction there is obtained a 60% yield of a white crystalline solid

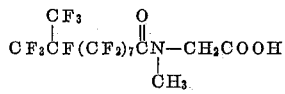

melting at 88.5–90° C. Analysis, calculated for $C_{14}H_6F_{21}NO_3$
C, 26.5; H, 0.95; N, 2.20; molecular weight, 635. Found: C, 26.8; H, 1.12; N, 2.22; molecular weight (neutralization equivalent), 635. The infrared spectrum of this compound displays strong bands at 5.70μ and 6.00μ.

The potassium, sodium and ammonium salts of the above acid are prepared following the procedures of Examples 3, 4 and 5 respectively. These salts are white crystalline solids.

*Example 16.—Preparation of N-methyl-N-[perfluoro(11-methyldodecanoyl)] aminoacetic acid*

Following the procedures of Example 14, the perfluorinated acid fluoride

is reacted with sarcosine $CH_3NHCH_2COOH$ in a molar ratio of acid fluoride to sarcosine of about 1:5 in refluxing dimethoxyethane for 6½ hours. There is obtained from this reaction a 68% yield of the product

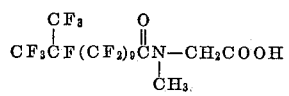

a white crystalline solid having a melting point of 105–107° C. Analysis, calculated for $C_{16}H_6F_{25}NO_3$: C, 26.1; H, 0.82; N, 1.91; molecular weight, 735. Found: C, 25.9; H, 0.72; N, 1.99; molecular weight (neutralization equivalent), 733. The infrared spectrum of this compound displays strong bands at 5.70μ and 6.01μ.

The potassium, sodium and ammonium salts of the above acid are prepared following the procedures of Examples 3, 4 and 5 respectively. These are white crystalline solids.

*Example 17.—Preparation of N-[perfluoro(9-methyldecanoyl)] aminoacetic acid*

This example illustrates an alternative procedure for the preparation of the compounds of the invention by reaction of an amino acid with a perfluorinated chlorosulfate.

A solution of 19.7 grams (0.029 mole) of perfluoro (9-methyldecyl) chlorosulfate,

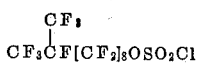

in 30 milliliters of anhydrous diethyl ether is added drop by drop to a stirred suspension of 22.5 grams (0.3 mole) of glycine, $NH_2CH_2COOH$, in 120 milliliters of anhydrous diethyl ether. The mixture is refluxed under nitrogen for 6 hours after which the reaction mixture is filtered to remove 21.8 grams of insoluble material and the filtrate is then washed with water, dried with anhydrous magnesium sulfate, and evaporated on a steam bath to give 14 grams (78% yield) of a liquid residue which rapidly solidifies on standing at room temperature. Recrystallization of this product from a mixture of benzene and ethyl acetate in the ratio of 9:1 provides a white crystalline solid having a melting point of 130–13° C. consisting of N-[perfluoro-(9-methyldecanoyl)] aminoacetic acid,

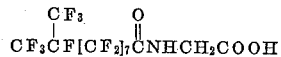

*Example 18.—Preparation of N-ethyl-N[perfluoro-(9-methyldecanoyl)] aminoacetic acid*

This example illustrates another alternative procedure for the preparation of the compounds of the invention.

(a) Preparation of

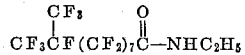

Into a stirred ice-cold solution of 523.5 grams (0.76 mole of

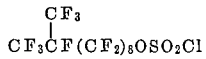

in 600 milliliters of anhydrous diethyl ether there is bubbled ethylamine gas over a period 7 hours. The mix- is filtered to remove insoluble material and the filtrate remove insoluble material and the filtrate refluxed for 3 hours. The reaction mixture is then washed with water, a water insoluble gel forms which after treatment with a large excess of isopropyl ether separates into two layers, an ether layer and an aqueous layer. The ether layer is dried and decolorized; the ether is evaporated leaving a brown liquid residue which is distilled in vacuo to give a colorless oily liquid which partially solidifies upon standing at room temperature. The crude product is purified by recrystallization from an 80:20 ethanol: water mixture. There is obtained 247 grams 55% yield) of a white crystalline product having a melting point of 53–54.5° C. consisting of N-ethyl-perfluoro(9-methyl-decan)amide,

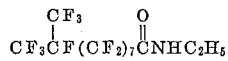

the infrared spectrum of which shows amide bands at 5.88μ and 6.47μ. Analysis, calculated for $C_{13}H_6F_{21}NO$: C, 26.4; H, 1.02; N, 2.37; F, 67.5. Found: C, 26.5; H, 0.88; N, 2.46; F, 68.2.

(b) Preparation of

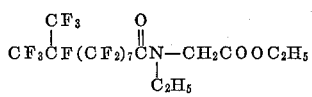

About 1 gram (0.04 gram atom) of reagent grade sodium is added to 250 milliliters of anhydrous toluene and the mixture heated at reflux until the sodium melts. To this mixture there is added slowly with continuous stirring 23.6 grams (0.04 mole) of the amide

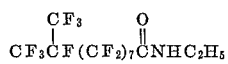

prepared as described above, and the mixture refluxed for 8 hours under anhydrous conditions. A light brown solid is formed. The toluene which forms as a supernatant liquid is pipetted out of the reaction flask under a flow of nitrogen after which 200 milliliters of anhydrous diethylene glycol dimethyl ether, is introduced. There is then added 13.4 grams (0.08 mole) of ethyl bromoacetate, $BrCH_2COOC_2H_5$, and this mixture refluxed for 30 hours. The reaction mixture is filtered to remove insoluble material after which the solvent of the filtrate is evaporated under reduced pressure. The liquid residue is distilled and there is obtained 12.6 grams (45% yield) of an oily product having a boiling point of about 130° C. at about 0.1 mm. Hg having the structure

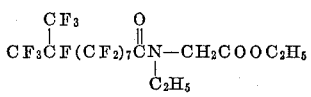

the infrared spectrum of which shows an ester band at 5.7μ and an amide band at 5.9μ. Analysis, calculated for $C_{17}H_{12}F_{21}NO_3$: C, 30.1; H, 1.79; N, 2.07. Found: C, 30.3; H, 1.82; N, 2.14.

(c) Hydrolysis of

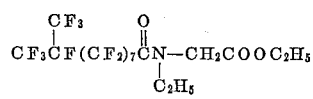

A mixture of 5 grams of the ester and 15 milliliters of 50% aqueous ethanol containing 0.6 gram of sodium hydroxide is shaken for 15 minutes until a clear one-phase solution is obtained. The solution is cooled in ice water, acidified with concentrated sulfuric acid after which 10 milliliters of water is added and the mixture shaken. An insoluble material forms which is extracted with diethyl ether. The ether solution is dried and evaporated on a steam bath leaving a liquid residue which solidifies upon drying overnight under reduced pressure. There is obtained 4.5 grams (93% yield) of the product N-ethyl-N-[perfluoro(9-methyldecanoyl)] aminoacetic acid,

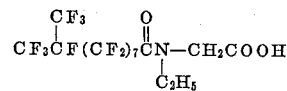

having a melting point of 70–70.5° C., the infrared spectrum of which shows bands at 5.73μ and 5.92μ. Analysis, calculated for $C_{15}H_8F_{21}NO_3$: C, 27.8; H, 1.24; N, 2.16; molecular weight, 649. Found: C, 27.8; H, 1.27; N, 2.12; molecular weight (neutralization equivalent), 641.

The potassium, sodium and ammonium salts of the foregoing acid are prepared in the manner described in Examples 3, 4 and 5 respectively. These salts are white crystalline solids.

*Example 19.—Preparation of N-[perfluoro(13-methyltetradecanoyl)]aminoacetic acid*

A solution of 9.74 grams (0.011 mole) of perfluoro[13-methyltetradecyl] chlorosulfate

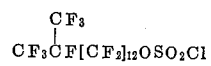

in 50 milliliters of hot anhydrous dimethoxyethane is slowly added to a stirred suspension of 13.5 grams (0.18 mole) of glycine, $NH_2CH_2COOH$, in 100 milliliters of anhydrous dimethoxyethane and the mixture is refluxed under dry nitrogen for 7½ hours. The reaction mixture is filtered to remove 13.0 grams of insoluble material and the solvent of the filtrate is removed by distillation in vacuo at a pot temperature of 50 to 60° C. The residue is extracted with four 100 millimeter portions of petroleum ether (a hydrocarbon mixture boiling from 30 to 60° C.) followed by extraction with four 100 milliliter portions of diethyl ether. The diethyl ether extract is filtered, washed with four 50 milliliter portions of water, dried with anhydrous magnesium sulfate and evaporated on a steam bath to yield 3.5 grams (39% yield) of a white solid residue having a melting point of 161.5–163° C. Recrystallization of this product from a mixture of dimethoxyethane and benzene in the ratio of 1:10 provides a pure product having a melting point of 164.5–165.5° C. consisting of the amido acid

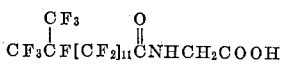

Analysis, calculated for $C_{17}H_4F_{29}NO_3$: C, 24.9; H, 0.49; N, 1.71. Found: C, 25.0; H, 0.68; N, 1.69.

The compounds prepared according to the foregoing examples having a terminally branched perfluoroalkyl chain represent particularly preferred embodiments of the invention. The following groups of compounds are of especial value both from the standpoint of ease of preparation and desirable properties:

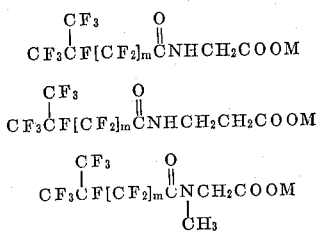

where $m$ is an integer from 5 to 10, and preferably from 7 to 9, and where M is hydrogen, alkali metal or ammonium.

The new compounds of the invention are characterized by their extraordinarily high surface activity. As mentioned previously they have been found to be more effective in a marked and surprising degree than the perfluorinated acids from which they are derived, as well as being more effective than analogous derivatives of such acids. They have likewise been found more effective than analogous compounds derived from perfluorinated sulfonic acids.

One particularly advantageous application for the compounds of the invention is their use as leveling agents for aqueous wax and/or resin emulsions which are widely used in the form of so-called self-polishing wax formulations which dry to a shine without buffing. These formulations comprise basically an aqueous phase which generally comprises at least about 50% and usually from 50% to 90% by weight of the formulation and dispersed in the aqueous phase a non-volatile film forming material which is usually a wax and/or a natural or synthetic resin which generally comprises from 10 to 50% by weight of the formulation, and a minor amount e.g. from 1–10% by weight of an emulsifying agent which serves to keep the film formed dispersed in the aqueous phase. Minor amounts of other modifying agents notably plasticizers may also be included.

Suitable film forming materials include natural and synthetic waxes such as carnauba, candellila, ouricury, beeswax, paraffin wax, microcrystalline waxes, montan and the like. Suitable film forming resins include e.g. shellac, polyethylene, polystyrene, polyacrylates, such as polybutylacrylate, polyvinylacetate, polyvinylchloride, and various copolymers such as copolymers of vinylidene chloride and acrylonitrile, and the like.

In some cases, a portion of the film former component may comprise an alkali soluble resin such as terpene modified phenolic resins, or rosin maleates or rosin fumarates. Such resins, usually employed in minor amounts relative to the other film formers, improve leveling characteristics and also enhance the removability of the polish with standard detergents. The film forming material may include mixtures of waxes, mixtures of resins, or mixtures of waxes and resins. Suitable emulsifying agents serving to keep the film former dispersed in the aqueous phase include e.g., anionic emulsifiers such as oleates or stearates of triethanolamine or of morpholine, alkali metal soaps of fatty acids such as sodium stearate or sodium oleate; cationic emulsifiers such as quaternary amine salts, e.g. trimethyl octadecyl ammonium chloride, or fatty amine acetates such as n-dodecyl amine acetate; nonionic emulsifying agents such as condensates of ethylene oxide with alkylated phenols or condensates of ethylene oxide with fatty acids such as oleic or stearic acid.

Suitable plasticizers, which are usually added in small amounts, include, for example, phosphate esters such as tricresyl phosphate, tributylmethyl phosphate, and phthalate esters such as dibutylphthalate and the like.

A necessary property of such self-polishing wax emulsions is that they spread easily and evenly on all types of floor surfaces to produce a uniform, high gloss film upon drying without the necessity of buffing. A formulation having this property is said to have good "leveling" characteristics. In order to achieve good leveling characteristics it is customary to employ a small amount of a so-called "leveling agent" whose function is to reduce the surface tension of the emulsion and thus produce good wetting of the surface to be coated. This wetting promotes the leveling of the liquid film producing a uniform coating of the film former covering the entire surface. Because of their remarkable surface properties, compounds containing a relatively long perfluorocarbon chain, such as relatively long chain carboxylic acids and sulfonic acids and various derivatives thereof have been employed for this purpose. Because of the high cost of these materials, it is highly desirable that they be effective in the smallest possible concentrations, and the minimum concentration at which the fluorinated compound will produce satisfactory leveling is a measure of its effectiveness.

The following comparative tests in which various fluorinated compounds, including those of the invention, were incorporated in a standard self-polishing wax formulation illustrate the extraordinary surface properties of the compounds of the invention. In these tests, a standard formulation, designated Formulation A, having the following composition, was employed:

FORMULATION A

| Component: | Parts by weight |
|---|---|
| Aqueous dispersion containing 30% by weight of polyethylene resin particles having melting point 213–221° F. | 222 |
| Aqueous dispersion containing 15% by weight of acrylic resin (Rhoplex B–83) | 1150 |
| Diethylene glycol monoethyl ether, $CH_2OHCH_2OCH_2CH_2OC_2H_5$ | 60 |
| Nonyl phenol-ethylene oxide condensation product, 9–10 mols ethylene oxide/mol of phenol | 12 |
| Tri(2-ethylhexyl) phosphate | 14 |
| Distilled water | 1968 |

To this formulation there was added varying amounts of various fluorinated leveling agents, including the compounds of the invention, and the minimum concentration at which effective leveling was observed was determined in each case. In order to obtain strictly comparative data, the same test procedures and the same type of surface to be coated were employed in each case. The test procedure was as follows:

A section of tile, 4½" x 4½" is laid horizontally with the finished surface upward. A teaspoonful (approximately 5 milliliters) of the polish formulation is poured onto the tile surface. Using only the bottom of the spoon, the liquid is spread until the entire surface area is covered. The tile is then set into a vertical position to allow the excess liquid to drain and the coating to dry. A visual inspection of the surface was made after approximately ten minutes. The minimum effective concentration is that which produces a completely coated surface with no puddling or heavily coated areas and which dries to a uniform glossy film. The tile employed in these tests had a surface composed of unfilled polyvinylchloride selected because of the difficulty of obtaining good leveling on such a surface.

In a first series of tests, a series of the compounds of the invention having from 8 to 12 carbon atoms in the perfluoroalkyl portion $C_nF_{2n+1}$ were tested to determine their minimum effective concentration, while at the same time, corresponding perfluorocarboxylic acids having the same number of carbon atoms in the perfluoroalkyl portion were similarly tested for minimum effective concentration for producing satisfactory leveling. The results of these tests are shown in Table I.

*Table I*

| Compound (as NH$_4$ or alkali metal salt) | Leveling activity (minimum concentration percent by wt. in Formulation A for satisfactory leveling) |
|---|---|
| $C_8F_{17}COOH$ | 0.20 |
| $C_8F_{17}CONHCH_2COOH$ | 0.08 |
| $C_8F_{17}CONHCH_2CH_2COOH$ | 0.08 |
| $C_8F_{17}CON(CH_3)CH_2COOH$ | 0.08 |
| $C_{10}F_{21}COOH$ | 0.10 |
| $C_{10}F_{21}CONHCH_2COOH$ | 0.04 |
| $C_{10}F_{21}CONHCH_2CH_2COOH$ | 0.05 |
| $C_{10}F_{21}CON(CH_3)CH_2COOH$ | 0.04 |
| $C_{10}F_{21}CONH(C_2H_5)CH_2COOH$ | 0.04 |
| $C_{12}F_{25}COOH$ | 0.075 |
| $C_{12}F_{25}CONHCH_2COOH$ | 0.03 |
| $C_{12}F_{25}CON(CH_3)CH_2COOH$ | 0.03 |

As it is apparent from the above data, in each case, the required concentration in the wax formulation to produce satisfactory leveling for the compounds of the invention was only half or less than half that required for corresponding perfluorinated carboxylic acids having the same number of carbon atoms.

In a second series of tests, a series of compounds of the invention having eight carbon atoms in the perfluoroalkyl portion $C_nF_{2n+1}$ were tested for leveling activity against analogous compounds having the same number of carbon atoms in the perfluoroalkyl portion. One of these was a sulfonamide derivative $C_8F_{17}SO_2N(C_2H_5)CH_2COOH$ while in another case an aminobenzoic acid derivative of a perfluorinated carboxylic acid having eight carbon atoms in the perfluoroalkyl group was tested. The results of these tests are shown in Table II below.

*Table II*

| Compound (as NH$_4$ or alkali metal salt) | Leveling activity (minimum concentration percent by wt. in Formulation A for satisfactory leveling) |
|---|---|
| $C_8F_{17}SO_2N(C_2H_5)CH_2COOH$ | 0.12. |
| $C_8F_{17}CONH$—⟨phenylene⟩—$COOH$ | Precipitates— ineffective at all concentrations. |
| $C_8F_{17}CONHCH_2COOH$ | 0.08. |
| $C_8F_{17}CONHCH_2CH_2COOH$ | 0.08. |
| $C_8F_{17}CON(CH_3)CH_2COOH$ | 0.08. |

As it is apparent from the data in the table above, the perfluorinated carboxylic acid derivatives of the invention in each case provided satisfactory leveling at a 50% lower concentration than that required for the analogous sulfonic acid derivative. The aminobenzoic acid derivative of the perfluorinated carboxylic acid was ineffective at all concentrations; precipitation occurred and essentially no leveling effect was produced.

In a third series of tests, a series of the compounds of the invention containing from 8 to 12 carbon atoms in the perfluoroalkyl portion $C_nF_{2n+1}$ were tested for leveling activity against similar compounds having in one case seven carbon atoms in the perfluoroalkyl portion and in the other fourteen carbon atoms. The results of these tests are shown in Table III.

*Table III*

| Compound (as potassium salt) | Leveling activity (minimum concentration percent by wt. in Formulation A for satisfactory leveling) |
|---|---|
| $C_7F_{15}CONHCH_2CH_2COOH$ | 0.3 |
| $C_8F_{17}CONHCH_2CH_2COOH$ | 0.08 |
| $C_8F_{17}CONHCH_2COOH$ | 0.08 |
| $C_{10}F_{21}CONHCH_2COOH$ | 0.04 |
| $C_{12}F_{25}CONHCH_2COOH$ | 0.03 |
| $C_{14}F_{29}CONHCH_2COOH$ | 0.4 |

As is apparent from the data in Table III, the extraordinary leveling activity depends critically upon the number of carbon atoms in the perfluoroalkyl portion. In the case of the compound having seven carbon atoms in the perfluoroalkyl portion, the minimum amount of leveling agent increased almost four-fold in contrast to the performance of the next compound in the series containing eight carbon atoms in the perfluoroalkyl portion. Even more surprisingly, the same diminishing activity is observed as the number of carbon atoms in the perfluoroalkyl portion is increased to fourteen. Note that the minimum required effective concentration increases more than twelve-fold as the number of carbon atoms in the perfluoroalkyl portion increases from 12 to 14.

The extraordinarily high surface activity of the compounds of the invention, as illustrated by the foregoing data, is highly advantageous in that it permits the compounds to be employed in considerably lower concentrations at a corresponding considerable savings in cost. The required concentration of leveling agent will rarely exceed about 0.1% by weight and will generally be used in concentrations of the order of 0.0001 to 0.05% by weight. The test formulation employed in the foregoing tests is a difficult one to level on any surface and the polyvinyl chloride surface employed is one which is quite difficult to wet and further increases the difficulties in obtaining good leveling. Since in most cases the leveling difficulties will not be as severe, the compounds of the invention will usually be employed in considerably lower concentrations than those indicated in the foregoing tests. In the case for example of formulations such as the following used to coat substrates such as rubber tile, linoleum, vinyl asbestos tile and the like, the compounds of the invention will be employed in concentrations of the order of 0.0001% to 0.02% to give satisfactory leveling characteristics:

FORMULATION B

| Component: | Parts by weight |
|---|---|
| Aqueous dispersion containing 36% by weight of polystyrene particles having an average particle size of about 0.03 micron containing emulsifying agent | 420 |
| Shellac | 26.8 |
| Ammonium hydroxide | 4 |
| Aqueous dispersion containing 30% by weight of polyethylene resin particles having melting points of 213–221° F. | 260 |
| Terpene-phenolic alkali soluble resin | 14 |
| Distilled water | 920 |
| Tri(2-ethylhexyl)phosphate | 22 |

FORMULATION C

| Component: | Parts by weight |
|---|---|
| Aqueous dispersion containing 15% by weight of acrylic resin (Rhoplex B-83) | 725 |
| Ammonium hydroxide solution of alkali soluble phenolic resin containing 15% by weight of resin | 165 |
| Aqueous dispersion containing 30% by weight of polyethylene resin particles having melting points 213–221° F. | 110 |
| $CH_2OHCH_2OCH_2CH_2OC_2H_5$ | 15 |
| Nonyl phenol-ethylene oxide condensation product, 9–10 mols ethylene oxide/mol of phenol | 3 |
| Tri(2-ethylhexyl)phosphate | 3.5 |

FORMULATION D

| Component: | Parts by weight |
|---|---|
| Part (a)— | |
| Carnauba wax | 135 |
| Microcrystalline wax | 67.5 |
| Oleic acid | 24.8 |
| Caustic soda | 3.6 |
| Borax | 6.8 |
| Distilled water | 1125 |
| Part (b)— | |
| Shellac | 37.7 |
| Ammonium hydroxide (concentrated) | 7.3 |
| Distilled water | 105 |

Formulation D is made up by mixing 454 parts by volume of Part (a) with 109 parts by volume of Part (b) and 346 parts by volume of distilled water.

FORMULATION E

| Component: | Parts by weight |
|---|---|
| Part (a)— | |
| Aqueous dispersion containing 36% by weight of polystyrene particles having an average particle size of about 0.03 micron | 8000 |
| Dibutylmethyl phosphate | 192 |
| Dibutyl phthalate | 240 |
| Distilled water | 16,864 |
| Part (b)— | |
| Aqueous dispersion containing 30% by weight of polyethylene resin particles having melting points of 213–221° F. | 110 |
| Oleic acid | 22 |
| Morpholine | 22 |
| Distilled water | 846 |
| Part (c)— | |
| Shellac | 450 |
| Sodium tetraborate (borax) | 54 |
| Distilled water | 3696 |

Formulation E is made up by mixing 60 parts by volume of Part (a) with 10 parts by volume of Part (b) and 30 parts by volume of Part (c).

In addition to their use as leveling agents in so-called self-polishing wax formulations as described above, the compounds of the invention are also useful as surfactants in the emulsion polymerization of ethylenically unsaturated compounds such as olefins, acrylates and the like, particularly in the polymerization or co-polymerization of fluorinated olefins and acrylates. The following examples illustrate the use of the compounds of the invention for such applications.

*Example 20.*—Homopolymerization of

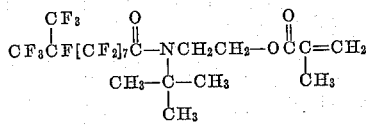

(a) Preparation of monomer: A solution of 56.6 grams (0.1 mole) of

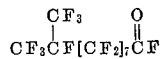

in 50 milliliters of anhydrous diethyl ether is added slowly to a stirred solution of 46.3 grams (0.25 mole) of tertiary-butylaminoethyl methacrylate,

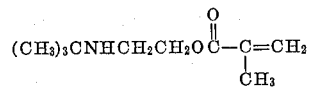

in 100 milliliters of anhydrous diethyl ether under dry nitrogen. During the addition, a small amount (0.5 gram) of a very fine white precipitate is formed which is filtered off after refluxing the reaction mixture for 4.5 hours. The filtrate is washed with 200 milliliters of water followed by four 100 milliliter portions of 1 N HCl, then with four 100 milliliter portions of 5% sodium bicarbonate solution and finally dried with anhydrous magnesium sulfate, and evaporated on a steam bath to yield 60.0 grams (82% yield) of a liquid residue which solidifies slowly on standing at room temperature. This product, having a melting point of 42.5–43.5° C., has the structure

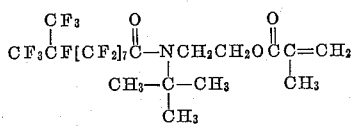

The infrared spectrum of this compound shows an ester band at 5.76μ, an amide band at 5.9μ, and a 6.1μ peak characteristic of a double bond. Analysis, calculated for $C_{21}H_{18}F_{21}NO_3$: C, 34.6; H, 2.48; N, 1.92. Found: C, 34.5; H, 2.61; N, 1.72.

(b) Homopolymerization: A solution of 5 grams of the above monomer in 4.0 milliliters of acetone is placed in a 7 oz. glass bottle. To this solution is added about 0.2 gram of the potassium salt of the compound of Example 14, i.e.

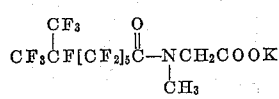

dissolved in 11.0 milliliters of deoxygenated, deionized water together with 0.15 gram of potassium persulfate as polymerization catalyst. The bottle is filled with nitrogen, capped, placed in a bath held at a constant temperature of 50° C., and maintained at this temperature with agitation for a period of 41 hours. There is obtained from this reaction a latex having a solids concentration of about 25% by weight and containing about 5 grams of polymer having the repeating units

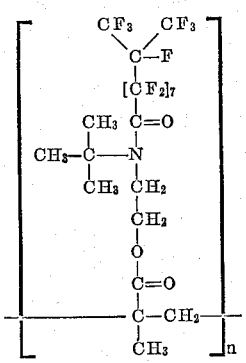

The homopolymer latex produced is ideally suited for the treatment of textiles and other fibrous materials in order to render them resistant to wetting by both aqueous and oleaginous systems. The textiles or other materials impregnated with such a latex are remarkably water and oil repellant due to the long chain perfluoroalkyl groups contained in the polymer chain.

(c) Copolymerization: The same procedures as described above for the homopolymerization are followed except that to the polymerization recipe employed for homopolymerization there is added 5.0 grams of butyl methacrylate as a comonomer and an additional 6 milliliters of deoxygenated, deionized water. There is obtained approximately 10 grams of a copolymer in the form of an aqueous latex having similar utility as the homopolymer.

*Example 21.—Polymerization of*

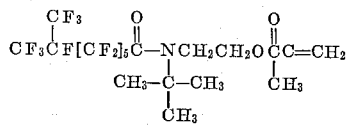

(a) Preparation of monomer: Following the procedures of Example 20, the acid fluoride

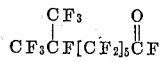

is reacted with tertiary butylaminoethyl methacrylate to provide a white crystalline product in 87% yield having a melting point of 41.5–42° C. and having the structure shown above. The infrared spectrum of this compound shows characteristic bands at 5.79μ, 5.9μ and 6.1μ. Analysis, calculated for $C_{19}H_{28}F_{27}NO_3$: C, 36.1; H, 2.87; N, 2.22. Found: C, 36.2; H, 3.10; N, 2.37.

(b) Polymerization and copolymerization: Following the procedure of Example 20, and employing as the surfactant the potassium salt of the compound of Example 2, i.e.

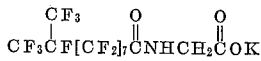

the above monomer is homopolymerized to form a latex containing approximately 25% solids. Following procedures similar to those used in Example 20, and using the above surfactant, the above monomer is copolymerized with an equal weight of neoprene.

*Example 22.—Polymerization of*

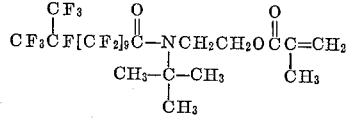

(a) Preparation of monomer: Following the procedure of Example 20, the acid fluoride

is reacted with tertiary butylaminoethyl methacrylate and there is obtained a white crystalline solid having the structure

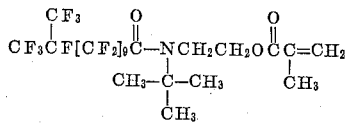

(b) Homopolymerization and copolymerization: Following the procedures of Example 20, the above monomer is homopolymerized in the presence of the ammonium salt of the compound of Example 8, i.e.

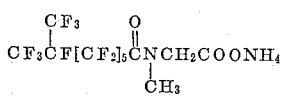

to provide a homopolymer in latex form. Using the same surfactant, the same monomer is copolymerized with about an equal weight of butadiene to provide the copolymer in the form of an aqueous latex.

*Example 23.—Polymerization of*

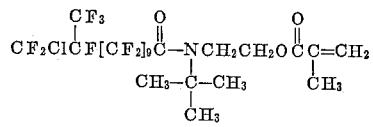

(a) Preparation of the monomer: To a stirred solution of 46.3 grams (0.25 mole) of tertiary butylaminoethyl methacrylate in 150 milliliters of anhydrous diethyl ether there is added drop by drop 68.2 grams (0.1 mole) of the acid fluoride

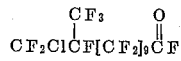

under nitrogen. The reaction is mildly exothermic and an insoluble material is formed during the addition period. The mixture is refluxed for three hours and then filtered to remove 1.5 grams of a white solid. The filtrate is washed with five 100 milliliter portions of 1 N HCl followed by washing with three 100 milliliter portions of 5% sodium bicarbonate solution and then with 100 milliliters of water. The organic layer is separated, dried with anhydrous magnesium sulfate and evaporated on a steam bath to provide 68.3 grams (81% yield) of a colorless liquid which solidifies slowly on standing at room temperature. This product has a melting point of 56–57.5° C. and has the strcture

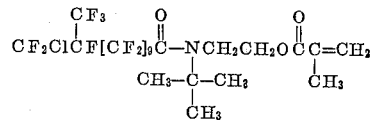

Its infrared spectrum shows characteristic bands at 5.78μ, 5.9μ, and 6.1μ. Analysis calculated for $C_{23}H_{18}ClF_{24}NO_3$: C, 32.6; H, 2.14; Cl, 4.18; N, 1.65. Found: C, 32.4; H, 2.27; Cl, 4.30; N, 1.64.

(b) Homopolymerization and copolymerization: Following the procedures of Example 20, the above monomer is homopolymerized in the presence of the potassium salt of the product of Example 11, i.e.

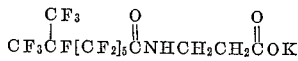

to produce a latex of the homopolymer. The latex thus produced is useful for the impregnation of textiles and other fibrous materials to impart a high degree of water repellancy and a moderate resistance to wetting and staining by oleaginous systems. A copolymer of the above monomer with butyl methacrylate is produced following the procedures of Example 20 and using the above surfactant. This copolymer has similar utility for the impregnation of textiles and other fibrous materials to impart water and oil repellancy.

*Example 24.—Polymerization of*

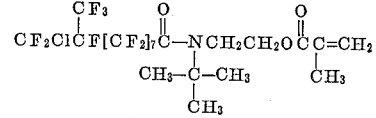

(a) Preparation of the monomer: Following the procedures of Example 23, the acid fluoride

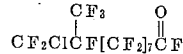

is reacted with tertiary butylaminoethyl methacrylate to provide an 80% yield of a white solid material having the above structure and having a melting point of 34–35° C. The infrared spectrum of this product shows characteristic bands of 5.8μ, 5.9μ, and 6.1μ. Analysis, calculated for $C_{21}H_{18}ClF_{20}NO_3$: C, 33.73; H, 2.43; Cl, 4.74; N, 1.87. Found: C, 33.67; H, 2.51; Cl, 4.69; N, 1.85.

(b) Polymerization and copolymerization: Following the procedures of Example 20, the above monomer is homopolymerized in an aqueous medium using a surfactant consisting of the ammonium salt of the product of Example 12, i.e., $$CF_3CF[CF_2]_7\overset{O}{\overset{\|}{C}}NHCH_2CH_2\overset{O}{\overset{\|}{C}}ONH_4$$
$$\overset{|}{CF_3}$$

There is obtained an aqueous latex containing approximately 20% solids useful for imparting water and oil repellancy to textile fabrics and the like. Following the procedures of Example 20 and using the same surfactant in an aqueous emulsion polymerization system, the above monomer is copolymerized with an approximately equal weight of butyl methacrylate to produce an equeous latex useful for similar applications.

In addition to their utility as leveling agents for self-polishing aqueous wax emulsions and as surfactants in emulsion polymerizations, the compounds of the invention are also useful in the form of free acids as intermediates for the formation of Werner type chrome complexes which in turn are useful for the impregnation of leather, paper and other fibrous materials to impart a high degree of water and oil repellancy thereto.

We claim:

1. Compounds of the formula $$C_nF_{2n+1}\overset{O}{\overset{\|}{C}}-N-R'-\overset{O}{\overset{\|}{C}}-OM$$
$$\overset{|}{R}$$

where $C_nF_{2n+1}$ is a perfluoroalkyl group having from 8 to 13 carbon atoms and having a chain length of at least seven carbon atoms; where $n$ is an integer from 8 to 13; where R is selected from the group consisting of hydrogen and alkyl groups having from 1 to 4 carbon atoms; where R' is selected from the group consisting of alkylene and monohydroxy alkylene radicals having from 1 to 6 carbon atoms; and where M is selected from the group consisting of hydrogen, alkali metal and ammonium.

2. Compounds in accordance with claim 1 in which said perfluoroalkyl group has from 10 to 12 carbon atoms.

3. Compounds in accordance with claim 1 in which R is hydrogen.

4. Compounds in accordance with claim 1 in which R is an alkyl group having 1 to 2 carbon atoms.

5. Compounds in accordance with claim 1 in which R' is an alkylene group having from 1 to 3 carbon atoms.

6. Compounds of the formula:

$$C_nF_{2n+1}\overset{O}{\overset{\|}{C}}-NH-R'\overset{O}{\overset{\|}{C}}OM$$

where $C_nF_{2n+1}$ is a perfluoroalkyl group having from 8 to 13 carbon atoms and having a chain length of at least 7 carbon atoms; where $n$ is an integer from 8 to 13; where R' is an alkylenne group having from 1 to 3 carbon atoms; and where M is selected from the group consisting of hydrogen, alkali metal and ammonium.

7. Compounds in accordance with claim 6 in which said perfluoroalkyl group contains from 10 to 12 carbon atoms.

8. Compounds of the formula $$C_nF_{2n+1}\overset{O}{\overset{\|}{C}}-N-R'-\overset{O}{\overset{\|}{C}}-OM$$
$$\overset{|}{R}$$

where $C_nF_{2n+1}$ is a perfluoroalkyl group having from 8 to 13 carbon atoms and having a chain length of at least 7 carbon atoms; where $n$ is an integer from 8 to 13; where R is an alkyl group having from 1 to 2 carbon atoms; where R' is an alkylene group having from 1 to 3 carbon atoms; and where M is selected from the group consisting of hydrogen, alkali metal and ammonium.

9. Compounds in accordance with claim 8 in which said perfluoroalkyl group contains from 10 to 12 carbon atoms.

10. Compounds of the formula $$CF_3CF[CF_2]_m\overset{O}{\overset{\|}{C}}NHCH_2COOM$$
$$\overset{|}{CF_3}$$

where $m$ is an integer from 5 to 10 and where M is selected from the group consisting of hydrogen, alkali metal and ammonium.

11. Compounds of the formula $$CF_3CF[CF_2]_m\overset{O}{\overset{\|}{C}}NHCH_2CH_2COOM$$
$$\overset{|}{CF_3}$$

where $m$ is an integer from 5 to 10 and where M is selected from the group consisting of hydrogen, alkali metal and ammonium.

12. Compounds of the formula:

$$CF_3CF[CF_2]_m\overset{O}{\overset{\|}{C}}-N-CH_2COOM$$
$$\overset{|}{CF_3}\qquad\overset{|}{CH_3}$$

where $m$ is an integer from 5 to 10 and where M is selected from the group consisting of hydrogen, alkali metal and ammonium.

References Cited by the Examiner
UNITED STATES PATENTS

| | | | |
|---|---|---|---|
| 2,764,602 | 9/1956 | Ahlbrecht | 260—404.5 |
| 2,764,603 | 9/1956 | Ahlbrecht | 260—404.5 |
| 2,943,099 | 6/1960 | Dohr et al. | 260—404.5 |
| 3,091,623 | 5/1963 | Knox et al. | 260—404.5 |

CHARLES B. PARKER, *Primary Examiner.*

JOSEPH P. BRUST, *Assistant Examiner.*